(12) United States Patent
Chen

(10) Patent No.: US 11,785,125 B2
(45) Date of Patent: Oct. 10, 2023

(54) ELECTRONIC DEVICE

(71) Applicant: BEIJING XIAOMI MOBILE SOFTWARE CO., LTD., Beijing (CN)

(72) Inventor: Jing Chen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 332 days.

(21) Appl. No.: 17/362,596

(22) Filed: Jun. 29, 2021

(65) Prior Publication Data

US 2022/0247847 A1 Aug. 4, 2022

(30) Foreign Application Priority Data

Jan. 29, 2021 (CN) .......................... 202110130198.5

(51) Int. Cl.
- *H05K 5/00* (2006.01)
- *H04M 1/02* (2006.01)
- *H04M 1/03* (2006.01)
- *H04R 17/00* (2006.01)

(52) U.S. Cl.
CPC ......... *H04M 1/0268* (2013.01); *H04M 1/035* (2013.01); *H04R 17/005* (2013.01); *H04R 2499/15* (2013.01)

(58) Field of Classification Search
CPC ...................................................... H05K 5/00
See application file for complete search history.

(56) References Cited

U.S. PATENT DOCUMENTS

| | | | |
|---|---|---|---|
| 2019/0098121 A1* | 3/2019 | Jeon | H04M 1/026 |
| 2019/0227603 A1 | 7/2019 | Noh et al. | |
| 2020/0004364 A1 | 1/2020 | Jung et al. | |
| 2020/0266845 A1* | 8/2020 | Kumar | G06F 1/1688 |
| 2020/0293084 A1 | 9/2020 | Ahn et al. | |

FOREIGN PATENT DOCUMENTS

| | | |
|---|---|---|
| CN | 111629305 A | 9/2020 |
| JP | 2015057880 A | 3/2015 |
| KR | 20190090106 A | 8/2019 |
| KR | 20200086483 A | 7/2020 |

OTHER PUBLICATIONS

European Patent Application No. 21182898.3 extended Search and Opinion dated Dec. 13, 2021, 7 pages.
Korean Patent Application No. 10-2021-0083237, Office Action dated Oct. 28, 2022, 6 pages.
Korean Patent Application No. 10-2021-0083237, English translation of Office Action dated Oct. 28, 2022, 7 pages.
Japanese Patent Application No. 2021-108712, Office Action dated Jul. 26, 2022, 5 pages.
Japanese Patent Application No. 2021-108712, English translation of Office Action dated Jul. 26, 2022, 4 pages.
Indian Patent Application No. 202144029150, Office Action dated Aug. 22, 2022, 6 pages.

* cited by examiner

*Primary Examiner* — Jerry Wu
(74) *Attorney, Agent, or Firm* — COZEN O'CONNOR

(57) ABSTRACT

The present disclosure relates to an electronic device. The electronic device includes: a display panel assembly; a piezoelectric sound-generating unit bonded to the display panel assembly along a thickness direction of the electronic device; and a structural member connected to the display panel assembly or connected to the piezoelectric sound-generating unit to close a cavity. The cavity is away from a side of the piezoelectric sound-generating unit bonded to the display panel assembly.

12 Claims, 2 Drawing Sheets

ELECTRONIC DEVICE

CROSS-REFERENCE TO RELATED APPLICATIONS

This application is based upon and claims priority to Chinese Patent Application Serial No. 202110130198.5, filed on Jan. 29, 2021, the entire contents of which are incorporated herein by reference for all purposes.

TECHNICAL FIELD

The present disclosure relates to the technical field of a display panel, and more particularly to a display panel for an electronic device.

BACKGROUND

At present, with the development of scientific research and technology, some communication device models on the market can produce sound through screen vibration of a display panel. However, in the related art, when vibrating, internal sound-generating elements can propagate the vibration not only to a screen side to produce sound, but also to a side away from the screen, which leads to sound leakage, and fails to protect privacy while users are making calls with the communication device.

SUMMARY

The present disclosure provides an antenna structure and an electronic device, to solve the shortcomings in the related art.

According to an embodiment of the present disclosure, an electronic device is provided. The electronic device includes: a display panel assembly; a piezoelectric sound-generating unit bonded to the display panel assembly along a thickness direction of the electronic device; and a structural member connected to the display panel assembly to define a cavity having the piezoelectric sound-generating unit arranged in the cavity; or connected to the piezoelectric sound-generating unit. In the thickness direction of the electronic device, there is a gap between the structural member and the piezoelectric sound-generating unit.

It should be understood that the above general description and the following detailed description are only exemplary and explanatory and do not limit the present disclosure.

BRIEF DESCRIPTION OF THE DRAWINGS

The accompanying drawings incorporated into the specification and forming part of the specification, illustrate embodiments in accordance with the present disclosure, and are used with the specification to explain the principles of the present disclosure.

DETAILED DESCRIPTION

Figure 1:
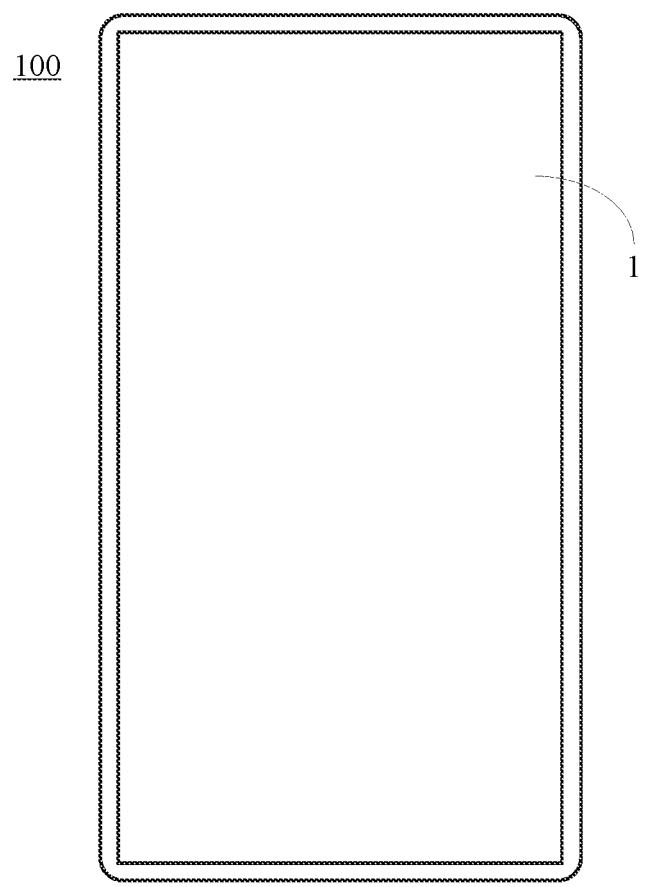
FIG. 1 is a schematic diagram of an electronic device with a display panel according to an exemplary embodiment.

Exemplary embodiments will be described in detail, and examples of the embodiments will be shown in the drawings. When the following description relates to the drawings, the same numbers in different drawings represent the same or similar elements unless otherwise indicated. The implementations described in the following exemplary embodiments do not represent all implementations consistent with the present disclosure. Instead, they are only examples of devices and methods consistent with some aspects of the present disclosure as detailed in the appended claims.

Terms used in the present disclosure are only for the purpose of describing specific embodiments, and are not intended to limit the present disclosure. As used in the specification and the appended claims, "a/an," "said" and "the" in singular forms are also intended to include plural forms, unless otherwise clearly indicated in the context. It should also be understood that the term "and/or" used herein represents and includes any and all possible combinations of one or more associated listed items.

It should be understood that although terms such as "first," "second," and "third" may be used to describe various kinds of information in the present disclosure, such information shall not be limited by these terms. These terms are only used to distinguish information of the same type from each other. For example, without departing from the scope of the present disclosure, the first information may also be referred to as the second information, and similarly, the second information may also be referred to as the first information. Depending on the context, the term "if" used here may be interpreted as "when" or "upon" or "in response to determining."

Figure 2:
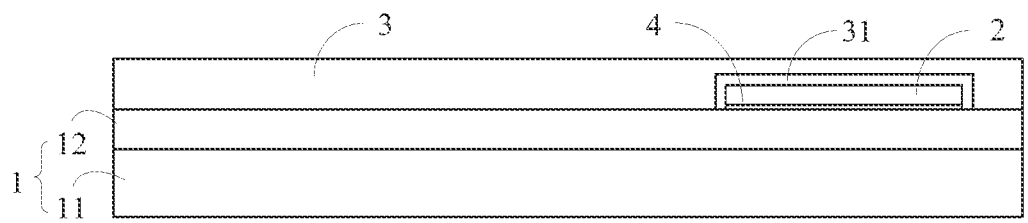
FIG. 2 is a partial schematic diagram of an electronic device with a display panel according to an exemplary embodiment.

FIG. 1 is a schematic diagram of an electronic device 100 according to an exemplary embodiment, and FIG. 2 is a partial schematic diagram of an electronic device 100 according to an exemplary embodiment. As shown in FIG. 1 and FIG. 2, the electronic device 100 may include a display panel assembly 1, a piezoelectric sound-generating unit 2 and a structural member 3. The display panel assembly 1 may include a flexible display layer 11 and a support layer 12 stacked on the flexible display layer 11. As shown in FIG. 2, the piezoelectric sound-generating unit 2 may be bonded to the support layer 12 along a thickness direction of the display panel assembly 1. Specifically, the piezoelectric sound-generating unit 2 may be bonded to the support layer 12 through a first tape 4. The structural member 3 may include a first avoiding groove 31. The support layer 12 may also be bonded to the structural member 3 to close the first avoiding groove 31. The piezoelectric sound-generating unit 2 is connected to an area, which closes the first avoiding groove 31, of the support layer 12, such that a cavity is defined by the support layer 12 and the structural member 3, and the piezoelectric sound-generating unit 2 is arranged in the cavity. In a thickness direction of the electronic device 100, there is a gap between the structural member 3 and the piezoelectric sound-generating unit 2, to prevent vibration from propagating in a direction away from the display panel assembly 1, resulting in sound leakage.

Figure 3:
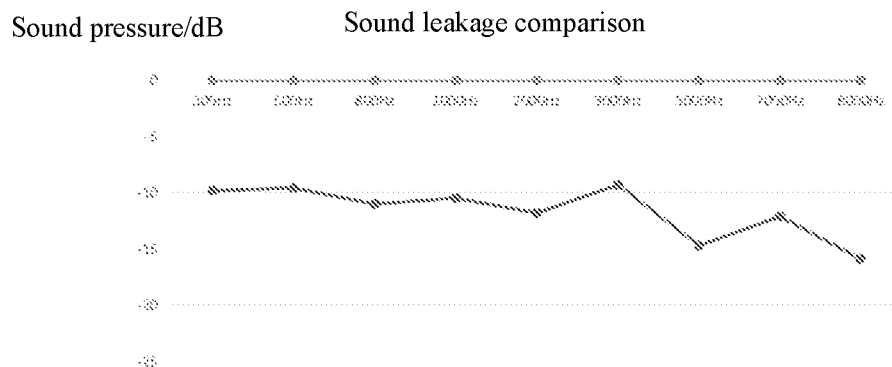
FIG. 3 is a graph illustrating sound pressure comparison between a display side and a non-display side of the electronic device in FIG. 1.

Based on an application scenario when a user is holding the electronic device and talking, the flexible display layer 11 usually faces the user's face and a back of the electronic device faces the ambient environment, such that a sound pressure condition on a first side where the flexible display layer 11 is located and a sound pressure condition on a second side away from the flexible display layer 11 are obtained, as shown in FIG. 3. The difference between sound pressure on the first side where the flexible display layer 11 is located and sound pressure on the second side away from the flexible display layer 11 is obtained by using the sound pressure condition on the first side where the flexible display layer 11 is located as a horizontal reference line. As shown in FIG. 3, the sound pressure difference is substantially between −10 dB and −15 dB, which may reduce the sound leakage.

In an embodiment shown in FIG. 2, the piezoelectric sound-generating unit 2 may include a piezoelectric film sound-generating unit or a piezoelectric ceramic sound-generating unit. The piezoelectric ceramic sound-generating unit may include a piezoelectric ceramic sheet. The piezoelectric ceramic sheet may include a lead zirconate titanate sheet. The piezoelectric film sound-generating unit may include a piezoelectric material layer, and the piezoelectric material layer may include a polyvinylidene fluoride film layer; or the piezoelectric material layer may include a polyvinylidene fluoride film composite layer, for example, a composite film layer of a polyvinylidene fluoride film and carbon nanotubes, or a composite film layer of a polyvinylidene fluoride film and piezoelectric ceramic; or the piezoelectric material layer may include a polyvinylidene fluoride film copolymer, such as a PVDF+TrFE (polyvinylidene fluoride-trifluoroethylene) copolymer.

Figure 4:
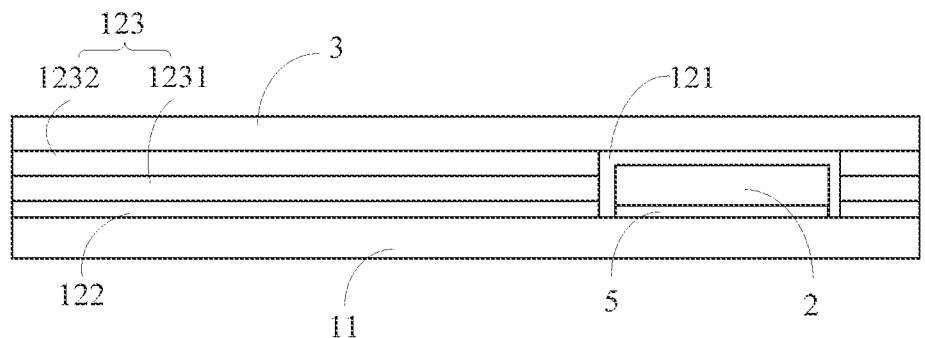
FIG. 4 is a partial schematic diagram of another electronic device with a display panel according to an exemplary embodiment.

In the embodiment of FIG. 2, an example in which the piezoelectric sound-generating unit 2 is connected to a side of the support layer 12 away from the flexible display layer 11 is illustrated. In other embodiments, as shown in FIG. 4, the support layer 12 may include an accommodation chamber 121 extending from the side away from the flexible display layer 11 toward the flexible display layer 11. The structural member 3 may be connected to the side of the support layer 12 away from the flexible display layer 11 to seal and cover the accommodation chamber 121, to form a cavity. The piezoelectric sound-generating unit 2 may be arranged in the accommodation chamber 121. When the accommodation chamber 121 extends to the flexible display layer 11, the piezoelectric sound-generating unit 2 may be connected to the flexible display layer 11. When the accommodation chamber 121 does not extend to the flexible display layer, the piezoelectric sound-generating unit 2 may be connected to the support layer 12, to shorten a vibration propagation path to a display side of the flexible display layer 11 and improve the efficiency of sound generation.

Figure 5:
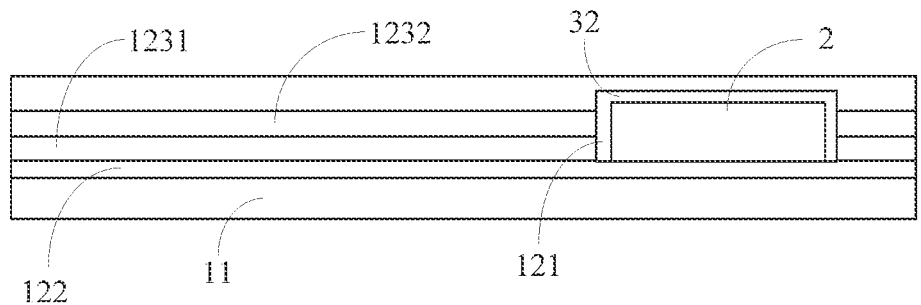
FIG. 5 is a partial schematic diagram of still another electronic device with a display panel according to an exemplary embodiment.

Specifically, as shown in FIG. 4, the support layer 12 may include a bonding layer 122 and a main body layer 123. The bonding layer 122 may bond the main body layer 123 with the flexible display layer 11. The main body layer 123 may include a foam layer 1231 and a copper foil layer 1232. In other embodiments, the main body layer 123 may also include a foam layer 1231 or a copper foil layer 1232. The accommodation chamber 121 penetrates the bonding layer 122 and the main body layer 123, and the piezoelectric sound-generating unit 2 may be connected to the flexible display layer 11 through a second tape 5. In another embodiment, as shown in FIG. 5, the accommodation chamber 121 may penetrate the main body layer 123, and the piezoelectric sound-generating unit 2 may be bonded to the bonding layer 122, in which the bonding layer 122 may include a light-shielding bonding layer, to avoid light leakage of the flexible display layer 11 by using a shielding function of the light-shielding bonding layer, compared with technical solution shown in FIG. 4.

In an embodiment shown in FIG. 4, the piezoelectric sound-generating unit 2 has a thickness less than a depth of the accommodation chamber 121, and a side of the structural member 3 towards the support layer 12 may be planar to close the accommodation chamber 121, which can maintain the integrity of the structural member 3 and avoid weakening the strength of the structural member 3. Especially when the structural member 3 is a middle frame of the electronic device 100, the overall strength of the electronic device 100 can be improved. However, in some other embodiments, as shown in FIG. 5, if the thickness of the piezoelectric sound-generating unit 2 is greater than the depth of the accommodation chamber 121, the structural member 3 may include a second avoiding groove 32 recessed from a first side of the structural member 3 towards the support layer 12 to a second side of the structural member 3 away from the support layer 12, and the second avoiding groove 32 is in communication with the accommodation chamber 121. In a depth direction of the accommodation chamber 121, there is a gap between the piezoelectric sound-generating unit 2 and the second avoiding groove 32, to reduce the vibration propagation away from the flexible display layer 11 and the sound leakage.

In the embodiment of FIG. 4, an example in which the piezoelectric sound-generating unit 2 is connected with the flexible display layer 11 and the thickness of the piezoelectric sound-generating unit 2 is less than the depth of the accommodation chamber 121 is illustrated. In an embodiment of FIG. 5, an example in which the piezoelectric sound-generating unit 2 is connected with the bonding layer 122 and the thickness of the piezoelectric sound-generating unit 2 is greater than the depth of the accommodation chamber 121 is illustrated. In other embodiments, the piezoelectric sound-generating unit 2 may be connected with the flexible display layer 11 and the thickness of the piezoelectric sound-generating unit 2 is greater than the depth of the accommodation chamber 121; the piezoelectric sound-generating unit 2 is connected with the bonding layer 122 and the thickness of the piezoelectric sound-generating unit 2 is less than the depth of the accommodation chamber 121, which is not limited by the present disclosure.

Figure 6:
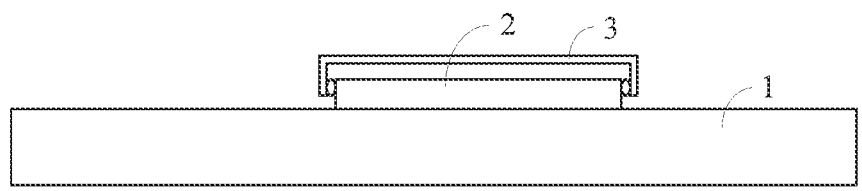
FIG. 6 is a partial schematic diagram of yet another electronic device with a display panel according to an exemplary embodiment.

In the above embodiments, the structural member 3 may be the middle frame of the electronic device 100. In other embodiments, the structural member 3 may also be other parts, which is not limited by the present disclosure. The above description illustrates a technical solution in which the structural member 3 and the display panel assembly 1 together define a cavity to reduce sound leakage. In other embodiments, as shown in FIG. 6, the structural member 3 may also be connected to the piezoelectric sound-generating unit 2, and an avoiding area may be formed on the structural member 3, so that after the structural member 3 is connected to the piezoelectric sound-generating unit 2, a separation distance between the structural member 3 and the piezoelectric sound-generating unit 2 may be greater than zero. The structural member 3 may include a middle frame to avoid the vibration propagation in a direction away from the flexible display layer 11. The piezoelectric sound-generating unit 2 connected to the structural member 3 may be connected with the side of the support layer 12 away from the flexible display layer 11 through a tape, or the piezoelectric sound-generating unit 2 may also be arranged in the accommodation chamber of the support layer 12, to shorten the vibration propagation path and improve the efficiency of sound generation.

In various embodiments described above, in the thickness direction of the electronic device, the gap between the structural member 3 and the piezoelectric sound-generating unit 2 is greater than 0.08 mm and less than 0.2 mm, to avoid a poor effect of preventing sound leakage due to too small a gap, and avoid an increase in the overall thickness of the electronic device due to too large a gap.

Other examples of the present disclosure will be apparent to those skilled in the art from consideration of the specification and practice of the present disclosure. The present disclosure is intended to cover any change, use or adaptation of the present disclosure, which complies with the general principles of the present disclosure and includes common knowledge or conventional technical means in the art that are not disclosed herein. The specification and examples are considered to be merely exemplary, and the true scope of the present disclosure are indicated by the following claims.

It should be understood that the present disclosure is not limited to the specific structures described above and shown in the accompanying drawings, and various modifications and changes may be made without departing from the scope of the present disclosure. The scope of the present disclosure is limited only by the appended claims.

What is claimed is:

1. An electronic device, comprising: a display panel assembly; a piezoelectric sound-generating unit bonded to the display panel assembly along a thickness direction of the electronic device; and a structural member connected to the display panel assembly to define a cavity having the piezoelectric sound-generating unit arranged in the cavity; or connected to the piezoelectric sound-generating unit; wherein a gap exists between the structural member and the piezoelectric sound-generating unit in the thickness direction of the electronic device; and the display panel assembly comprises: a flexible display layer; and a support layer bonded to the flexible display layer along the thickness direction of the electronic device; and the support layer comprises an accommodation chamber extending from a side of the support layer away from the flexible display layer; the structural member is connected to the side of the support layer away from the flexible display layer to seal the accommodation chamber with a bond layer, to form the cavity; and the support layer comprises the bonding layer and a main body layer, and the bonding layer bonds the main body layer with the flexible display layer; the accommodation chamber penetrates the main body layer, and the piezoelectric sound-generating unit is arranged in the accommodation chamber and bonded to the bonding layer, wherein the bonding layer comprises a light-shielding bonding layer.

2. The electronic device according to claim 1, wherein the structural member comprises a first avoiding groove, and the support layer is connected to the structural member to seal the first avoiding groove, to form the cavity, wherein the piezoelectric sound-generating unit is connected to an area, sealing the first avoiding groove, of the support layer.

3. The electronic device according to claim 1, wherein the piezoelectric sound-generating unit has a thickness less than a depth of the accommodation chamber, and a side of the structural member towards the support layer is planar.

4. The electronic device according to claim 1, wherein the piezoelectric sound-generating unit has a thickness greater than a depth of the accommodation chamber, and the structural member comprises a second avoiding groove recessed from a first side of the structural member towards the support layer to a second side of the structural member away from the support layer, wherein the second avoiding groove is in communication with the accommodation chamber to form the cavity.

5. The electronic device according to claim 1, wherein the structural member comprises a middle frame.

6. The electronic device according to claim 1, wherein the cavity has a height of greater than 0.08 mm and less than 0.2 mm in a thickness direction of the piezoelectric sound-generating unit.

7. The electronic device according to claim 1, wherein the piezoelectric sound-generating unit comprises a piezoelectric ceramic unit or a piezoelectric film unit.

8. The electronic device according to claim 7, wherein the piezoelectric ceramic unit comprises a piezoelectric ceramic sheet, and the piezoelectric ceramic sheet comprises a lead zirconate titanate sheet.

9. The electronic device according to claim 7, wherein the piezoelectric film unit comprises a piezoelectric material layer, and
wherein the piezoelectric material layer comprises a polyvinylidene fluoride film layer, a polyvinylidene fluoride film composite layer, or a polyvinylidene fluoride film copolymer.

10. The electronic device according to claim 1, wherein the support layer comprises a bonding layer and a main body layer, and the main body layer comprises at least one of a foam layer and a copper foil layer.

11. The electronic device according to claim 4, wherein a gap exists between the piezoelectric sound-generating unit and the second avoiding groove in a depth direction of the accommodation chamber.

12. The electronic device according to claim 1, wherein a difference between sound pressure on a first side where the flexible display layer is located and sound pressure on a second side away from the flexible display layer is between −10 dB and −15 dB.

* * * * *